(12) United States Patent
Langstroth

(10) Patent No.: US 10,378,274 B2
(45) Date of Patent: Aug. 13, 2019

(54) KITTY DOOR KNOCKER

(71) Applicant: Michael David Langstroth, Springfield (CA)

(72) Inventor: Michael David Langstroth, Springfield (CA)

( * ) Notice: Subject to any disclaimer, the term of this patent is extended or adjusted under 35 U.S.C. 154(b) by 175 days.

(21) Appl. No.: 15/731,826

(22) Filed: Aug. 10, 2017

(65) Prior Publication Data
US 2019/0048653 A1  Feb. 14, 2019

(51) Int. Cl.
*A01K 29/00* (2006.01)
*E06B 7/28* (2006.01)
*G08B 3/02* (2006.01)
*A01K 1/04* (2006.01)
*A01K 15/02* (2006.01)
*G10K 3/00* (2006.01)

(52) U.S. Cl.
CPC .............. *E06B 7/28* (2013.01); *A01K 1/04* (2013.01); *A01K 15/02* (2013.01); *G08B 3/02* (2013.01); *G10K 3/00* (2013.01)

(58) Field of Classification Search
CPC ....................................................... F06B 7/28
USPC ........................................ 119/702, 707–711
See application file for complete search history.

(56) References Cited

U.S. PATENT DOCUMENTS

| 2,698,598 A * | 1/1955 | Hadley | A01K 15/025 119/708 |
| 3,085,551 A | 4/1963 | Helmer | |
| 4,400,696 A | 8/1983 | Klingensmith | |
| 4,517,922 A | 5/1985 | Lind | |
| 4,576,116 A * | 3/1986 | Binkert | A01K 1/033 119/498 |
| 4,686,504 A | 8/1987 | German | |
| 4,712,510 A * | 12/1987 | Tae-Ho | A01K 15/025 119/708 |
| 4,907,537 A * | 3/1990 | Shirk | A01K 15/025 119/707 |
| 5,038,703 A | 8/1991 | Frush | |
| 5,148,769 A * | 9/1992 | Zelinger | A01K 15/025 119/708 |
| 5,216,978 A * | 6/1993 | Lovell | A01K 15/025 119/708 |
| 5,275,128 A | 1/1994 | Barnes | |
| 5,303,677 A | 4/1994 | Jones | |
| 5,474,032 A * | 12/1995 | Krietzman | A01K 15/025 119/708 |
| 5,604,478 A | 2/1997 | Grady et al. | |

(Continued)

*Primary Examiner* — Richard T Price, Jr.
(74) *Attorney, Agent, or Firm* — Mario Theriault

(57) ABSTRACT

A door knocker for use by a cat for requesting entry into a house. This knocker comprises a mounting block attached to a door surface; a longitudinal spring having a first end mounted to the mounting block and a second end extending vertically downward from the first end. A hardwood ball is mounted to the second end. The ball is held at a knocking distance from the door surface. A string with loose frayed ends is attached to the second end of the spring near the ball. A cat coming near the door knocker is attracted to the string with frayed ends and instinctively starts to play with the string to operate the door knocker into a series of repetitive door knocks. The door knocker according to the present invention does not require any significant physical or mental effort from a cat.

20 Claims, 2 Drawing Sheets

(56) References Cited

U.S. PATENT DOCUMENTS

| | | | | |
|---|---|---|---|---|
| 5,803,786 A | * | 9/1998 | McCormick | G09F 19/08 |
| | | | | 119/708 |
| 5,829,391 A | * | 11/1998 | Krietzman | A01K 15/025 |
| | | | | 119/708 |
| 5,924,387 A | * | 7/1999 | Schramer | A01K 15/025 |
| | | | | 119/708 |
| 5,988,114 A | | 11/1999 | Krietzman et al. | |
| 6,318,300 B1 | * | 11/2001 | Renforth | A01K 15/025 |
| | | | | 119/702 |
| 6,360,694 B1 | * | 3/2002 | Noto | A01K 15/025 |
| | | | | 119/707 |
| D473,020 S | | 4/2003 | DeRaspe-Bolles et al. | |
| 6,629,510 B1 | * | 10/2003 | Robkin | A01K 15/025 |
| | | | | 119/707 |
| 6,743,072 B2 | * | 6/2004 | Nelson | G09F 19/02 |
| | | | | 119/707 |
| 7,543,550 B2 | * | 6/2009 | Simpson | A01K 15/025 |
| | | | | 119/708 |
| 7,621,235 B2 | | 11/2009 | Genitrini | |
| 7,900,584 B2 | * | 3/2011 | Suring | A01K 15/025 |
| | | | | 119/702 |
| D644,797 S | | 9/2011 | Haaf | |
| 8,065,977 B1 | | 11/2011 | Wilks | |
| D672,514 S | | 12/2012 | Dyer et al. | |
| 8,371,249 B1 | * | 2/2013 | Little | A01K 15/025 |
| | | | | 119/707 |
| 8,640,653 B2 | * | 2/2014 | Cook | A01K 15/025 |
| | | | | 119/707 |

\* cited by examiner

KITTY DOOR KNOCKER

FIELD OF THE INVENTION

This invention pertains to door knockers, and more particularly, it pertains to door knockers for cats.

BACKGROUND OF THE INVENTION

Although a pet needs to go outside to exercise and enjoy a natural environment, it is considered inhumane to leave a pet outside during a storm and during cold weather conditions. However, pets do not always come to a call. Pets and especially cats are known to roam in a backyard and hide. It is therefore difficult for a pet owner to call a cat inside upon hearing a weather forecast. It is also difficult to predict the exact time that a pet will be at the door waiting to come in.

This problem has been addressed by a number of inventors in the past. For examples, several electrical door chimes have been designed for operation by a pet, either by pressing on paw lever or by rubbing its body against a plate-like actuator. The following documents described electrical door chimes for pets.
U.S. Pat. No. 4,400,696 issued to Robert R. Klingensmith on Aug. 23, 1983;
U.S. Pat. No. 4,686,504 issued to Richard W. German on Aug. 11, 1987;
U.S. Pat. No. 5,303,677 issued to George D. Jones on Apr. 19, 1994;
U.S. Pat. No. 5,604,478 issued to Tamara L. Grady et al., on Feb. 18, 1997.

Another pet annunciator has been found in the prior art. This device is described in the following document:
U.S. Pat. No. 5,038,703 issued to Roberta K. Frush on Aug. 13, 1991.

This publication described a strip of vinyl lacing, to which are attached several sleigh bells. The strip of vinyl lacing is attached to a door knob such that when a cat climbs on the strip of vinyl lacing, the sound of the bells alerts the pet owner of the presence of the pet outside the door.

In yet another pet annunciator, a ball is attached to a string and suspended to a door knob. As understood, the movement of the ball against the door, when a cat is playing with the ball, alerts the pet owner inside the house. This device is described in the following document: U.S. Pat. No. D672,514 issued to Miraculous Dyer et al., on Dec. 11, 2012.

Although the door chimes and pet annunciators found in the prior art deserve undeniable merits, it is believed that a cat is not always attracted to a ball. It is believed that some pets can never be trained to press a paw switch. Furthermore, it is believed that a cat has no desire to jump and climb on a vinyl lacing when it is cold and raining outside. When the outdoor conditions are unfavorable, a cat tends to bundle up on itself, to puff up its fur and to lay still to conserve energy.

Therefore, it is believed that there is a need in the field of pet door knockers for an efficient design that has appeal to cats and that is easily operable by most cats. It is believed that there is a need in the field of pet door knockers for a door knocker that does not require a cat to jump, to climb or otherwise spend a lot of energy.

SUMMARY OF THE PRESENT INVENTION

In the present invention, there is provided a kitty door knocker having an actuator that is instinctively attractive to cats. This actuator comprises a piece of string with frayed ends. This string is attached to the end of a spring carrying a hardwood ball. Any slight pull and release on the string causes to ball to produce a series of repetitive knocks against a door surface.

In a first aspect of the present invention, there is provided a door knocker for use by a cat for requesting entry into a house. This knocker comprises: a mounting block attached to a door surface; a longitudinal spring having a first end mounted to the mounting block and a second end extending vertically downward from the mounting block. A hardwood ball is mounted to the second end. The ball is held at a knocking distance from the door surface. A string is attached to the second end of the spring near the ball. The string has loose frayed ends extending away from the ball.

A cat coming near the door knocker is attracted to the string with frayed ends and instinctively starts to play with it, to operate the door knocker. The door knocker according to the present invention does not require any significant physical or mental effort from a cat.

Still another feature of the kitty door knocker according to the present invention is that it is susceptible of a low cost of manufacture with regards to both materials and labor, and which accordingly is then susceptible of low prices of sale to the consumer, thereby making such kitty door knocker economically available to the public.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the kitty door knocker according to the present invention is described with the aid of the accompanying drawings, in which like numerals denote like parts throughout the several views.

The drawings presented herein are presented for convenience to explain the functions of all the elements includes in the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

DESCRIPTION OF THE PREFERRED EMBODIMENT

Figure 1:
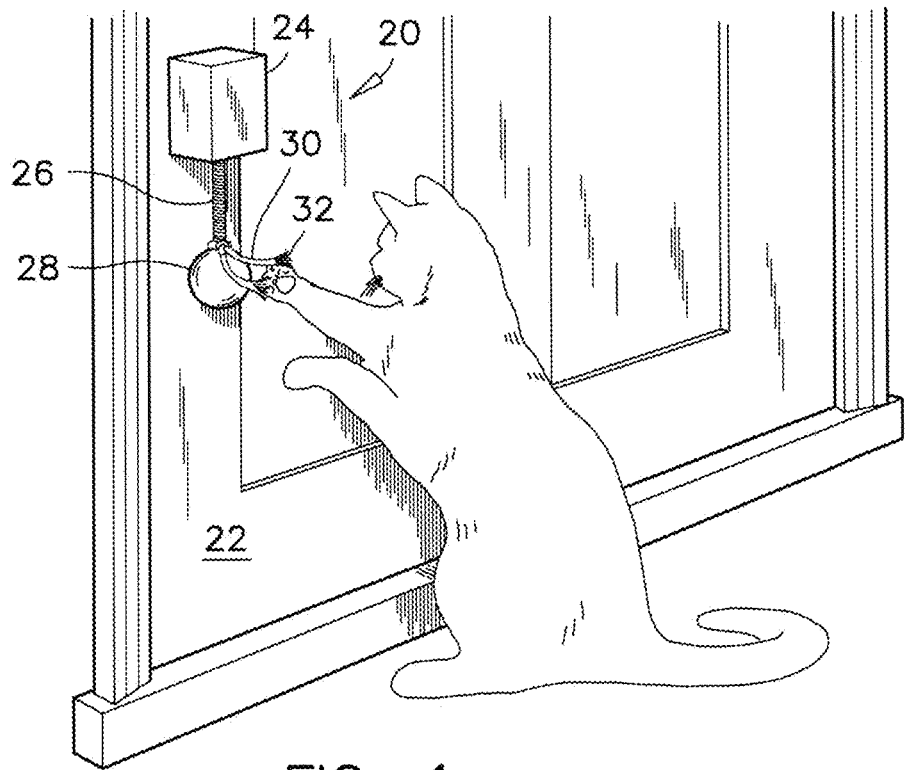
FIG. 1 is an illustration of the kitty door knocker installed on a door of a house, and being used by a cat.
Figure 2:
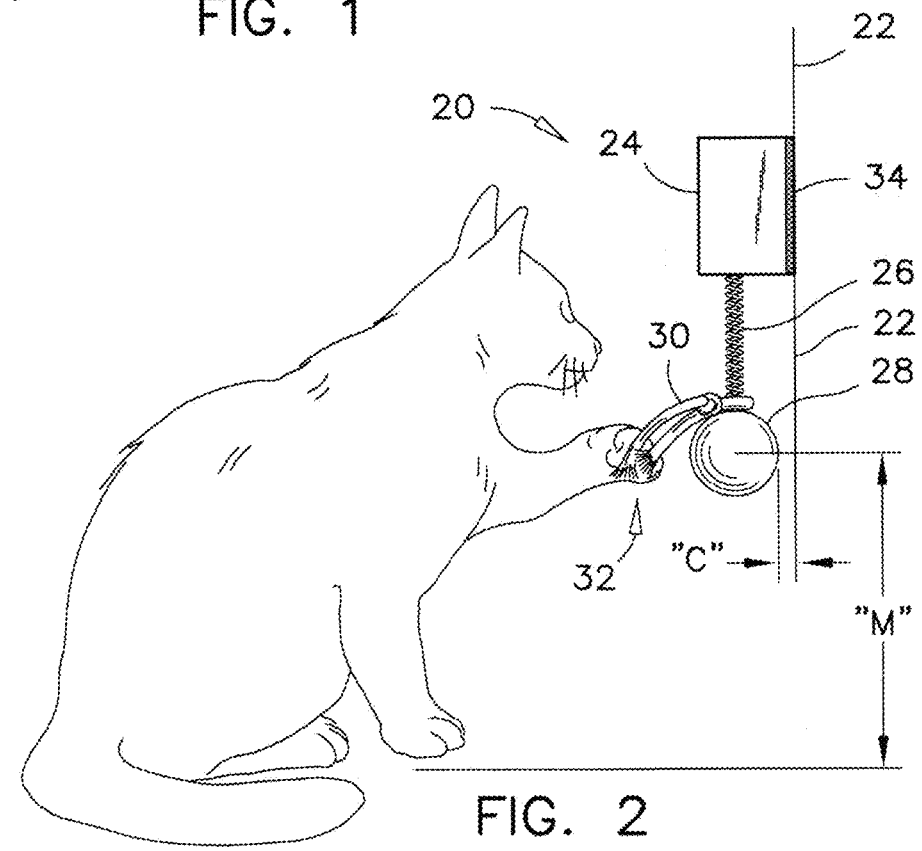
FIG. 2 is another illustration of a cat playing with the frayed ends on a string of the door knocker according to the preferred embodiment of the present invention.

Referring to FIGS. 1 and 2, the kitty door knocker 20 according to the preferred embodiment of the present invention is mounted to the outside surface 22 of a door, at a height "M" that is Accessible to an average size cat. As can be understood, the kitty door knocker 20 can be mounted anywhere across the width of the door.

Broadly, the kitty door knocker 20 is comprised of a mounting block 24, a spring 26 extending downward from the mounting block 24, a hardwood ball 28 and a piece of string 30 with frayed ends 32 attached to the lower end of the spring 26. It will be appreciated that line 22 in FIG. 2 also represents the mounting plane of the mounting block 34.

More specifically, the spring 24 is a compression spring having a preferred diameter of about ¼ inch, a wire size of about 0.048 inch, and is wound to about 10 turns per inch.

The mounting block 24 is preferably retained to the door surface 22 by a double-sided adhesive tape 34, although a magnetic pad will also work if the door knocker 20 is installed on a metal door.

The spring 26 and the hardwood ball 28 are mounted to the mounting block 24 in such a way as to hold the ball surface at a knocking distance "C" from the door surface 22 of about ¼ inch, as illustrated in FIG. 2.

While the purpose of the hardwood ball 28 is to produce a knock against the door surface 22, the purpose of the string 30 with frayed ends 32 is to attract the attention of a cat. A cat is not always interested by hardwood ball, especially when the ball is plain and stationary. However, most cats are intrigued by a string 30 with frayed ends 32. When a cat sits by a door having the kitty door knocker 20 installed thereon, the cat is almost always interested by the string 30 with frayed ends 32 and instinctively plays with it. As a result, the ball 28 is repeatedly pulled from the door surface 22 and let go. Because of the spring 26 and the clearance "C", the balls 28 hits the door surface 22 and bounces back to generate two to three distinctive knocks. The distinctive knocks are much like a person does when working a regular door knocker, both in intensity of frequency.

Preferably, the string 30 is black in color and is made of shoe lace material. The string 30 is simply wound and knotted around the lower end of the spring 26. The frayed ends 32 lay on the ball 28 while extending away from the ball 28. The length of the loose ends of the string 30 is about 1.25 to 2 inches. Although the color black works well for the string 30 with frayed ends 32, other colors may work as well or better.

Figures 3, 4:
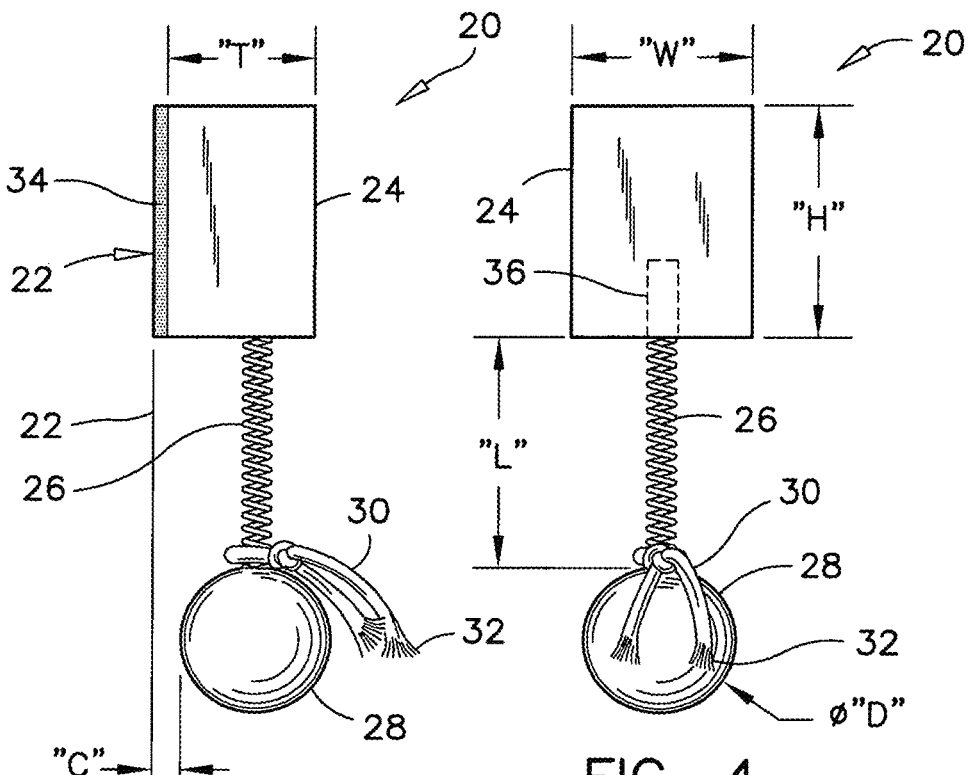
FIG. 3 is a side view of the preferred door knocker.
FIG. 4 is a front view of the preferred door knocker.
Figure 5:
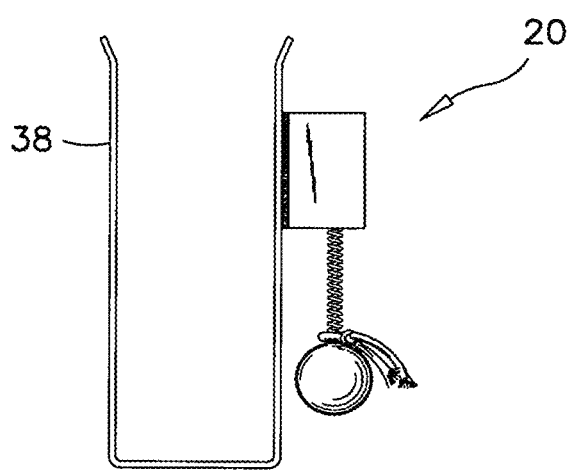
FIG. 5 is a side view the preferred kitty door knocker mounted to a U-shaped door bracket.

Referring now to FIGS. 3-5, preferred dimensions of the preferred kitty door knocker 20 will be explained.

The mounting block 24 is preferably made of cedar wood or other softwood for reducing shipping weight and postage during delivery to a buyer. The mounting block 24 has a preferred width "W" of 1½ inches; a preferred height "H" of 2 inches; and a preferred thickness "T" of 1¼ inches. The preferred spring free length "L" is about 2 inches, and the preferred ball diameter is "D" is 1¼ inches.

The hardwood ball 28 is preferably made of maple wood or similar hardwood. It will be appreciated that a plastic or a metal ball would also work. However, the sound and the series of repeat knocks made by a maple ball is preferred.

The spring 24 is inserted with a tightly fitted connection into a cavity 36 in the mounting block 24 and into a similar cavity inside the ball 28.

Referring now to FIG. 5, the kitty door knocker 20 according to the preferred embodiment of the present invention can also be mounted to a U-shaped door clamp 38 as illustrated. The door clamp 38 with the door knocker 20 mounted thereon is removably mountable to the bottom on a common door.

In use, after installing the kitty door knocker to a door for the first time, a pet owner must be attentive to a cat first approaching the door knocker 20. If the pet owner opens the door at the first knocks from the door knocker 20, a cat will associate a door being opened with its play with the door knocker 20. It has been experienced that a cat quickly learns to use this kitty door knocker 20.

What is claimed is:

1. In combination, a door and a door knocker mounted to said door for use by a cat for requesting entry through a doorway of said door; said door knocker comprising:
    a mounting block attached to a surface of a lower portion of said door;
    a longitudinal spring having a first end mounted to said mounting block and a second end extending vertically downward from said mounting block; said spring extending parallel to said door surface at a distance from said door surface; said spring having an amplitude extending toward and away from said door surface;
    a hard ball mounted directly to said second end of said spring; said hard ball being held at a knocking distance from said door surface; and
    a string attached to said second end of said spring near said hard ball, said string having loose frayed ends extending away from said hard ball;
    said hard ball and said spring being configured for bouncing said hard ball against said door surface and for generating a series of repeat door knocks when a cat plays with said string and moves said ball and said spring.

2. The combination as claimed in claim 1, wherein said spring has a free length of about 2 inches and said knocking distance is about ¼ inch.

3. The combination as claimed in claim 1, wherein said hard ball is made of hardwood.

4. The combination as claimed in claim 3, wherein said hard ball is made of maple wood.

5. The combination as claimed in claim 1, wherein said mounting block is made of cedar wood.

6. The combination as claimed in claim 1, wherein said mounting block is retained to said door surface by a double-sided adhesive tape.

7. The combination as claimed in claim 1, wherein said string is made of black shoe lace, and said frayed ends extend loosely about 1½ to 2 inches away from said hard ball.

8. In combination, a door and a door knocker mounted to said door for use by a cat for requesting entry through a doorway of said door; said door knocker comprising:
    a mounting block having a plane that is attached to a door surface on a lower portion of said door;
    a longitudinal spring having a first end mounted to said mounting block and a second end extending vertically downward from the first end and said mounting block, said spring extending parallel with said door surface, at a distance from said door surface; said spring having an amplitude extending toward and away from said door surface;
    a hardwood ball mounted directly to said second end of said spring; said ball being held at a knocking distance from said plane; and
    a string attached to said second end of said spring near said ball, said string having loose frayed ends extending away from said hardwood ball
    said hardwood ball and said spring being configured for bouncing said ball against said door surface and for generating a series of repeat door knocks when a cat plays with said string and moves said ball and said spring.

9. The combination as claimed in claim 8, wherein said spring has a free length of about 2 inches, said ball has a diameter of about 1¼ inches, and said knocking distance is about ¼ inch.

10. The combination as claimed in claim 8, wherein said ball is made of maple wood.

11. The combination as claimed in claim 8, wherein said mounting block is made of cedar wood.

12. The combination as claimed in claim 8, wherein said string is made of black shoe lace, and said frayed ends extending about 1½ to 2 inches away from said hardwood ball.

13. In combination, a door and a door knocker mounted to said door for use by a cat for requesting entry through a doorway of said door; comprising:
 a U-shaped door bracket mounted to an edge of said door;
 a mounting block mounted to said door bracket;
 a longitudinal spring having a first end mounted to said mounting block and a second end extending vertically downward from the mounting block, said spring extending parallel to said door surface, said spring having an amplitude extending toward and away from said door surface;
 a hardwood ball mounted directly to said second end of said spring; and
 a string attached to said second end of said spring near said ball, said string having loose frayed ends extending away from said ball.

14. The combination as claimed in claim 13, wherein said ball being mountable at a knocking distance from said door surface when said mounting block is affixed to said door surface.

15. The combination as claimed in claim 14, wherein said spring has a free length of about 2 inches and said knocking distance is about ¼ inch.

16. The combination as claimed in claim 14, wherein said ball is made of maple wood.

17. The combination as claimed in claim 13, wherein said string is made of black shoe lace, and said frayed ends extend loosely about 1½ to 2 inches away from said ball.

18. The combination as claimed in claim 13, wherein said spring is a compression spring having a diameter of ¼ inch; a wire size of about 0.048 inch and 10 turns per inch.

19. The combination as claimed in claim 13, wherein said spring is tightly fitted into said mounting block and into said ball.

20. The combination as claimed in claim 13, wherein said string is wound and knotted around said spring.

\* \* \* \* \*